(12) United States Patent
McPherson, Jr.

(10) Patent No.: US 6,873,461 B1
(45) Date of Patent: Mar. 29, 2005

(54) CASE FOR ROLLER-OPERATED SCREEN SYSTEM

(75) Inventor: Jerry L. McPherson, Jr., Greenfield, IN (US)

(73) Assignee: Draper, Inc., Spiceland, IN (US)

( * ) Notice: Subject to any disclaimer, the term of this patent is extended or adjusted under 35 U.S.C. 154(b) by 221 days.

(21) Appl. No.: 10/374,298

(22) Filed: Feb. 25, 2003

(51) Int. Cl.$^7$ ................................................ E06B 9/56
(52) U.S. Cl. ...................... 359/461; 160/903; 160/23.1
(58) Field of Search ......................... 359/461; 160/23.1, 160/26, 38, 39, 263, 903

(56) References Cited

U.S. PATENT DOCUMENTS

| | | |
|---|---|---|
| 4,045,123 A | 8/1977 | Brown |
| 4,060,310 A | 11/1977 | Brown |
| 4,072,404 A | 2/1978 | Brown |
| 4,159,162 A | 6/1979 | Christoffel |
| 4,403,761 A | 9/1983 | Jamar |
| 5,274,499 A | 12/1993 | Shopp |
| 5,296,964 A | 3/1994 | Shopp |
| 5,323,831 A | 6/1994 | Manthei |
| 5,341,241 A | 8/1994 | Shopp |
| 5,523,880 A | 6/1996 | Pidgeon et al. |
| 5,647,421 A | 7/1997 | Hoffmann et al. |
| 5,848,634 A | 12/1998 | Will et al. |
| 6,100,659 A | 8/2000 | Will et al. |
| 6,201,364 B1 | 3/2001 | Will et al. |
| 6,336,616 B1 | 1/2002 | Lin |
| 6,532,109 B1 | 3/2003 | Shopp |

OTHER PUBLICATIONS

Somfy; "Automatic Control Systems"; Somfy Pre-Assembled Plug-In Wiring Systems; date unknown.
Draper, Inc.; "Products for Visual Communication"; 11132/DRC; BuyLine 3260; Catalogue, 1996.
Product brochure entitled "Products for Visual Communication," by Draper Shade & Screen Co., Inc. of Spiceland, Indiana, 1995.
Somfy Systems, Inc., "Why Stop With a Motor?" flyer, 1986.
MechoShade Systems, Inc., "ElectroShade® II Double-Shade Bracket #13 with 5113 Pocket" flyer, 1998.
MechoShade Systems, Inc., "The Mecho/ElectroShade™ System: Pockets & Accessories" flyer, 1994.
Brochure on Extrusion Design (Aluminum) by Engineers Edge on quickparts.com; copyright 2000–2003; 4 pages.
The Shapemakers® Extrusion Spotlight; a publication of the Aluminum Extruders Council; copyright 2000; 6 pages.
"Access Dual Roller FlexShade Submittal/Planning Sheet" by Draper, Inc.; copyright 2002; 6 pages.
Brochure on the Rolleramic and Paragon Ceiling–Recessed Motorized Screens by Draper, Inc.; 1 page.
Dimensions and Data Sheet and Installation/Operating Instructions on the Paragon model by Draper, Inc.; copyright 2002; 4 pages.
Installation/Operating Instructions for the Ultimate Access Electric Projection Screen by Draper, Inc.; copyright 2002; 4 pages.
Installation Instructions for Access FlexShade by Draper, Inc.; copyright 2002; 2 pages.
Statement of Jerry L. McPherson, Jr. dated Jun. 4, 2003 (8 pages).

*Primary Examiner*—William C. Dowling
(74) *Attorney, Agent, or Firm*—Norman J. Hedges; Baker & Daniels (57) ABSTRACT

A screen system is disclosed for displaying an image projected by a projector or for partially or fully blocking light from entering a room. The screen system includes a housing and a screen assembly. The housing includes a plurality of extruded housing segment and at least one coupler configured to couple the segments together.

24 Claims, 8 Drawing Sheets

CASE FOR ROLLER-OPERATED SCREEN SYSTEM

BACKGROUND AND SUMMARY OF THE INVENTION

The present invention relates to roller-operated or other screen systems. More particularly, the present invention relates to cases for roller-operated or other screen systems.

According to the present invention, a screen system is provided that includes a screen assembly and a screen housing. The screen assembly includes a roller and a screen. The screen housing has a longitudinal axis and defines an interior region. The screen is positioned in the interior region of the screen housing. The screen housing includes a plurality of extruded segments positioned in parallel relationship and at least one coupler positioned to couple at least two of the extruded segments together. The coupler extends parallel to the at least two extruded segments.

According to another aspect of the present invention, a screen system is provided including a screen assembly and a screen housing. The screen assembly includes a roller and a screen. The screen housing has a longitudinal axis and defines an interior region. The roller and screen are positioned in the interior region of the screen housing. The screen housing includes first and second housing segments positioned in parallel relationship and at least one coupler positioned to couple the first and second housing segments together. The coupler includes a first channel and a second channel. A portion of the first housing segment is positioned in the first channel and a portion of the second housing is positioned in the second channel.

According to another aspect of the present invention, a screen system is provided that includes a screen assembly and a screen housing. The screen assembly includes a roller and a screen. The screen housing has a longitudinal axis and defines an interior region. The roller and screen are positioned in the interior region of the screen housing. The screen housing includes first and second extruded housing segments positioned in parallel relationship and a first coupler positioned to couple the first and second extruded housing segments together. The second extruded housing segment is a substantial mirror image of the first extruded housing segment.

According to another aspect of the present invention, a screen system is provided that includes a screen assembly and a screen housing. The screen assembly includes a roller and a screen. The screen housing has a longitudinal axis and defines an interior region. The roller and screen are positioned in the interior region of the screen housing. The screen housing includes at least one extruded member having a longitudinal length and nominal wall thickness. The nominal wall thickness-to-longitudinal length ratio being less than $8 \times 10^{-4}$.

According to another aspect of the present invention, a screen system is provided including a screen assembly, a screen housing, and a closure. The screen assembly includes a roller and a screen. The screen housing defines an interior region. The roller and screen are positioned in the interior region of the screen housing. The screen housing has first and second side walls. The first side wall includes a wall formation thereon. The closure has a closure formation. The closure formation is configured to couple the closure to the wall formation. The closure and the second side wall define an opening therebetween sized to permit the screen to move therein during raising and lowering of the screen relative to the screen housing. The wall formation and the closure formation cooperate to permit movement of the closure along a path transverse to the first wall to couple the closure formation to the wall formation.

Additional features of the present invention will become apparent to those skilled in the art upon consideration of the following detailed description of an illustrated embodiment exemplifying the best mode of carrying out the invention as presently perceived.

BRIEF DESCRIPTION OF THE DRAWINGS

A detailed description particularly refers to the accompanying figures in which.

DETAILED DESCRIPTION OF THE DRAWINGS

According to the present disclosure, a screen system 10 is provided. According to one application, screen system 10 is used as a projection screen system to display images projected by a projector (not shown). According to another application, screen system 10 is used as a window screen or shade system to block sun or other light from entering a room.

Figure 1:
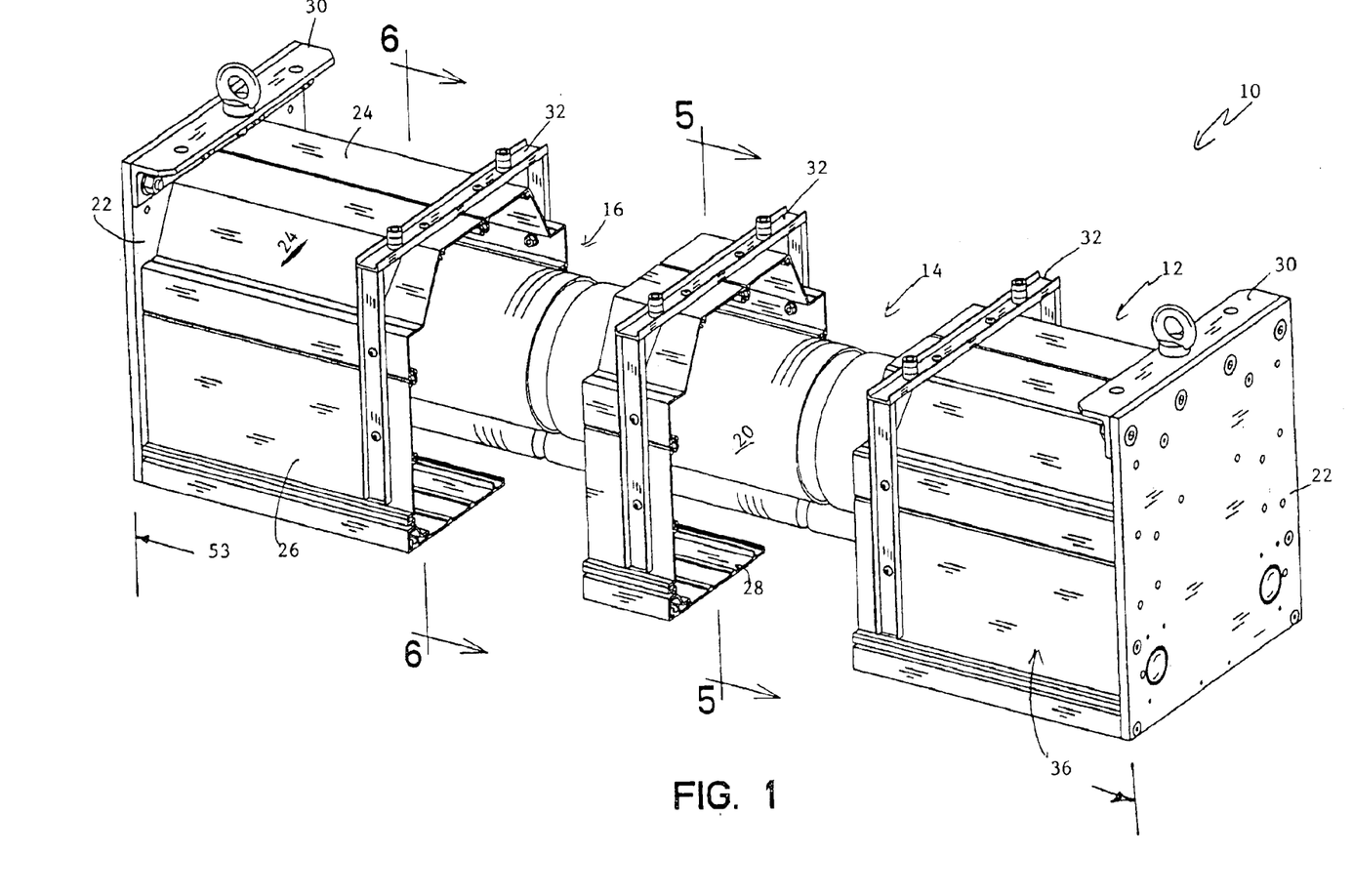
FIG. 1 is a perspective view of a screen system including a screen case or housing (shown with portions cut away) and a screen assembly (shown with portions cut away) positioned in an interior region of the screen housing.
Figure 6:
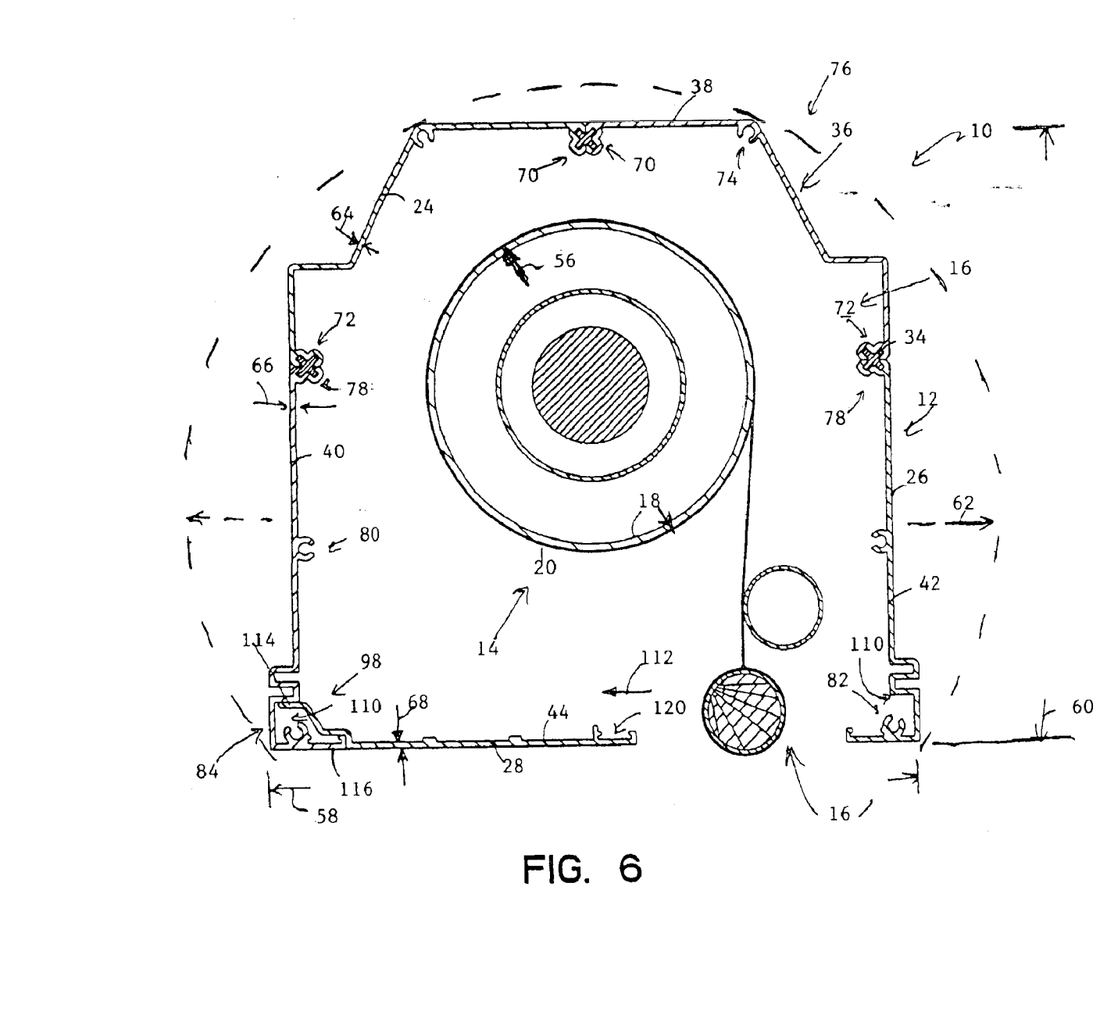
FIG. 6 is a view similar to FIG. 5 taken along line 6—6 of FIG. 1.
Figure 7:
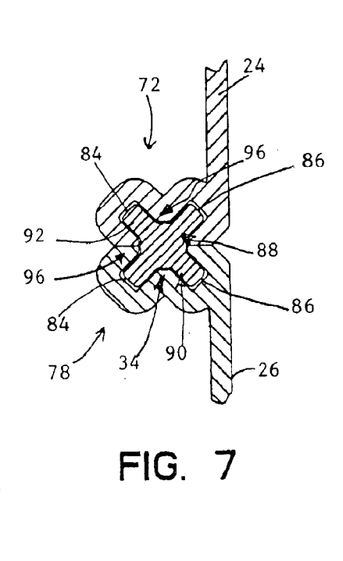
FIG. 7 is an enlarged view of a portion of FIG. 6 showing two of the extruded housing segments coupled together by one of the couplers.

As shown in FIG. 1, screen system 10 includes a screen case or housing 12 and a screen assembly 14 positioned in an interior region 16 of housing 12. Preferably, screen assembly 14 includes a roller 18 rotatably mounted in housing 12 and a screen 20 wrapped around roller 18 as shown in FIGS. 6 and 7. In a projection screen application, screen 20 is lowered before a presentation is projected on screen 20. When the presentation is complete, screen 20 is raised fully or partially back into housing 12. In a window shade application, screen 20 is lowered to cover a window to block light from entering the room. When it is no longer necessary or desirable to block the light from the room, screen 20 is raised back into housing 12.

Figure 2:
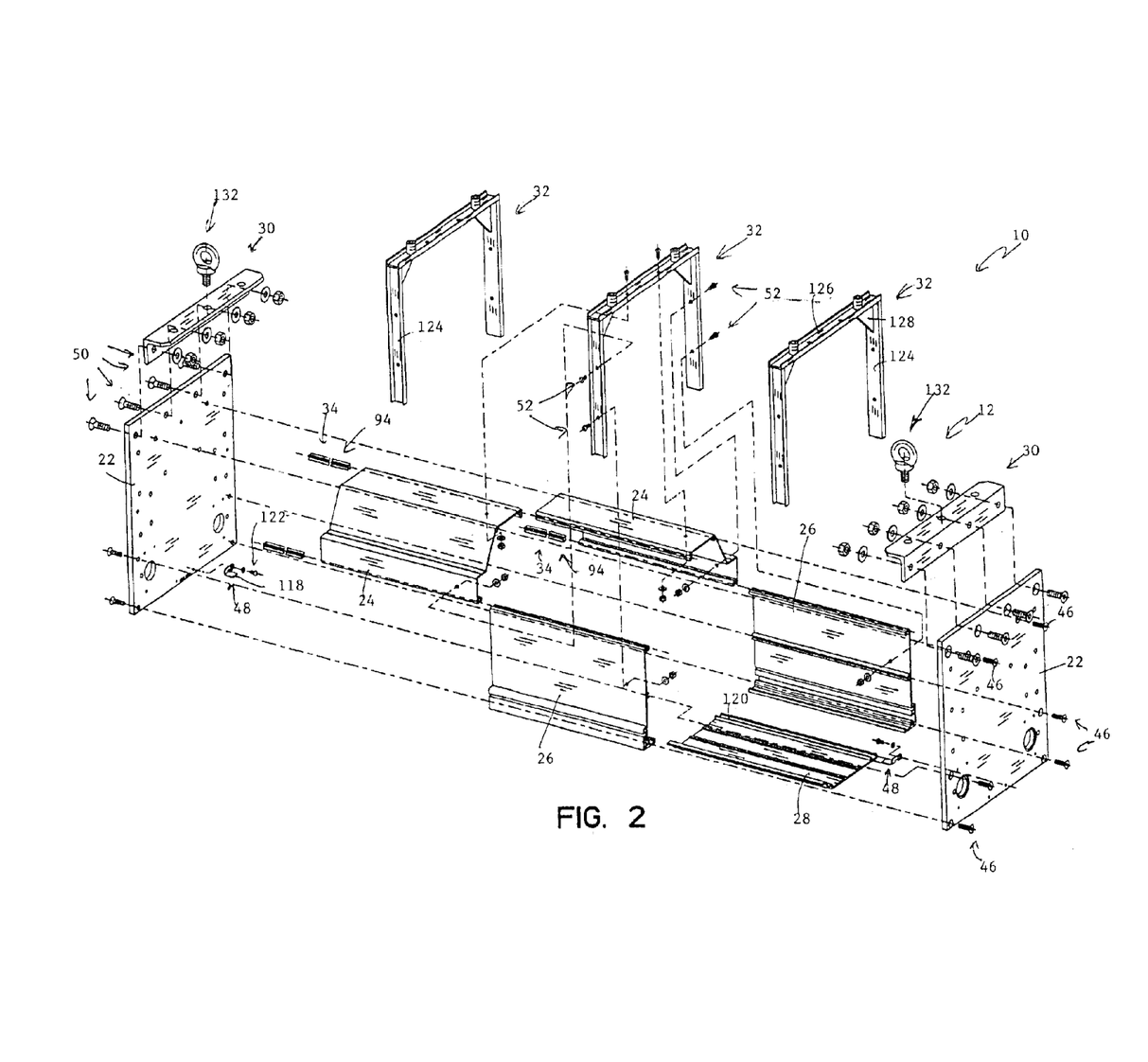
FIG. 2 is a perspective exploded view of the screen housing of FIG. 1 showing the screen housing including a pair of end caps, three mounting brackets, and four extruded housing segments coupled together with a plurality of elongated couplers.

As shown in FIG. 2, housing 12 includes a pair of end plates 22 that support screen assembly 14, a pair of upper extruded housing segments 24, a pair of lower extruded housing segments 26, a closure 28, a pair of plurality of L-shaped mounting brackets 30, and a plurality of U-shaped mounting brackets 32. When assembled, end plates 22, housing segments 24, 26, and closure 28 cooperate to define interior region 16 of housing 12.

Upper and lower housing segments 24, 26 are coupled together with a plurality of couplers 34 to define a housing body 36 as shown in FIG. 6. Upper housing segments 24 are coupled together by couplers 34 to define a top wall 38 of housing body 36. Respective lower housing segments 26 are coupled to respective upper housing segments 24 by couplers 34 to define first and second side walls 40, 42 of housing body 36. Closure 28 can be coupled to either of lower housing segments 26 in a manner described in additional detail below to define a bottom wall 44 of housing body 36. End plates 22 are coupled to housing segments 24, 26 with fasteners 46 and closure 28 is coupled to end plates 22 with clips 48. L-shaped mounting brackets 30 are coupled to end plates 22 with fasteners 50 and U-shaped mounting brackets 32 are coupled to housing body 36 with fasteners 52. Fasteners 52 are shown as a bolt that mates with a washer and nut. According to alternative embodiments of the present disclosure, other fasteners are provided such as pop-rivets, screws, or other fasteners know to those of ordinary skill in the art.

Depending on the specific application, housing body 36 may have a length 53 less than 3 feet or greater than 30 feet. Furthermore, screen 20 will have a corresponding width 54 to match length 53 of housing body 36 and an unrolled length up to 80 feet. Because of the possible length of screen 20 and the thickness of the fabric or other material comprising screen 20, roller 18 has a diameter 56 of about 6 inches as shown in FIG. 6. To accommodate roller 18 and screen 20 wrapped on roller 18, housing body 36 is relatively large. For example, housing body 36 has a preferred width 58 of about 12 inches and a preferred height 60 of about 10.5 inches. With a screen 20 having a thickness of about 0.025 inches, screen 20 may be about 30 feet long. With screen 20 made of thinner material of about 0.012 inches, screen 20 may be about 80 feet long.

Because of the configuration and dimensions of housing body 36, a diameter 62 of an imaginary circle that circumscribes housing body 36 is about 15.1 inches. Extruding a one-piece housing body with such large dimension is prohibitively expensive. To reduce the expense of providing an extruded housing body, extruded housing body 36 is made of multiple smaller components including upper and lower housing segments 24, 26, and couplers 34. According to alternative embodiments of the present disclosure, fewer or more housing segments are provided. For example, according to one embodiment, the upper and lower housing segments are formed as a one-piece extrusion. According to other alternative embodiments of the present disclosure, the housing body is further divided into five or more segments.

Upper and lower housing segments 24, 26 and couplers 34 are made of extruded 6063 aluminum. According to alternative embodiments, other aluminum alloys are used such as 6061, 2024, 7050, 7075, or other aluminum alloys. According to other alternative embodiments, other extrudable materials are used such as plastics or other extrudable materials known to those of ordinary skill in the art.

Imaginary circles (not shown) that circumscribe upper and lower housing segments 24, 26 and closure 28 have diameters of less than 7 inches. Because these diameters are significantly less than diameter 62, nominal wall thicknesses 64, 66, 68 of upper and lower housing segments 24, 26 and closure 28 are substantially less than otherwise feasible for a one-piece housing body. Preferably, wall thicknesses 64, 66, 68 are 0.10 inches. According to alternative embodiments, the wall thicknesses range from about 0.078 inches to about 0.125 inches. According to other embodiments, other wall thicknesses are provided.

Upper housing segments 24 are mirror images of each other. Each upper segment includes a pair of coupler formation 70, 72 that interact with couplers 34 and a fastener-receiving channel 74 sized to receive fasteners 46 extending through end plates 22. Each upper housing segment defines a corner 76 of box-like housing body 36.

Lower housing segments 26 are mirror images of each other. Each lower segment 26 includes a coupler formation 78 that interacts with couplers 34 and a pair of fastener-receiving channels 80, 82 sized to receive fasteners 46. Lower segments 26 also includes formations 84 that interact with closure 28.

Each coupler formation 70, 72, 78 includes a pair of channels 84, 86 that cooperate to define a V-shaped channel 88 as shown in FIG. 7. When respective coupler formations 70, 72, 78 are positioned adjacent one another, they cooperate to define an X-shaped channel 90 as shown in FIG. 7.

Couplers 34 are X-shaped to correspond to X-shaped channel 90. Each coupler 34 includes four lugs 92 that are arranged at 90 degree angles from each other. To couple the respective housing segments 24, 26, couplers 34 are inserted into X-shaped channels 90. To facilitate this insertion, an impact device, such as a hammer or pneumatic impact hammer is used to drive couplers 34 down channels 90. Preferably, each coupler 34 is broken down into a plurality of coupler segments 94 having the X-shape. Preferably each segment 94 is 98 inches long. Depending on length 52 of housing body 36, two or more segments 94 are used so that coupler 34 extends substantially along length 52 of housing body 36. If necessary, ones br more segments 94 may be trimmed to length.

Lugs 92 cooperate to define channels 96 therebetween. These channels 96 receive one or more portions of respective formations 70, 72, 78 of respective upper and lower housing segments 24, 26 to couple upper and lower housing segments together. As shown in FIG. 7, coupler 34 is internally of upper and lower housing segments 24, 26. According to alternative embodiments, couplers are provided that are external of the housing segments. For example, according to one alternative embodiment, the coupler is C-shaped and "traps" two lipped flanges of adjacent housing segments. According to other alternative embodiments of the present disclosure, other couplers such as screws, bolts, rivets, or other fasteners known to those of ordinary skill in the art are provided.

Closure 28 includes a formation 98 that interacts with formation 84 of lower housing segments 26. Depending on which side of roller 18 screen 18 unrolls, closure 28 can be mounted to either of lower housing segments 26. Furthermore, if necessary in the location of installation, screen assembly 14 can be removed from housing 12 and reversed so that the ends of screen assembly 14 are mounted on the reserve ends of housing 12. This may be necessary if the side on which screen 18 unrolls needs to be reversed. In this situation, closure 28 is moved from one of lower housing segments 26 to the other of lower housing segments 26 without the need to uncouple housing body 36 from the ceiling.

Formations 84 of lower housing segments 26 include channels 110 that open in a horizontal direction to receive formation 98 of closure 28. Because channel 110 open in horizontal direction, formation 98 can be inserted into channel 110 by moving closure 28 in a horizontal direction 112 so that it is unnecessary to rotate closure 28 up into interior region 16. By avoiding rotation of closure 28 into interior region 16, closure 28 does not run into clearance issues with roller 18. Because closure 28 does not run into clearance issues with roller 18, housing body 36 can have a shorter height. According to alternative embodiments of the present disclosure, some rotation or other movement of the closure into the interior region is required, but still does not run into clearance issues with the roller. For example, according to some embodiments, the closure and side wall of the housing body define angles of up to 50, 60, 70, 80 degrees therebetween during installation to mate the formations together. Another suitable closure is described in U.S. Pat. No. 6,421,175, to Shopp, the disclosure of which is expressly incorporated by reference herein.

When formation 98 is inserted into channel 110 and closure is released, an end 114 of formation 98 presses up on lower housing segment 26 and an end 116 of formation 84 of lower housing segment 26 presses up on formation 98 of closure. To further secure closure 28, clips 48 (shown in FIG. 2) are coupled to closure 28 and end plates 22. Clips 48 include a flange 118 that is inserted into channels 120 formed in closure 28. Clips 48 also includes fastener-receiving apertures that receives fasteners 122 that extends into end plates 22 to secure closure 28 to each of end plates 22 and block movement of formation 98 out of formation 84. According to one method of coupling closure 28 to lower housing segment 26, fasteners (not shown) are provided to couple formations 98, 84 together.

L-shaped brackets 30 extend inwardly toward each other as shown in FIG. 2. By extending L-Shaped brackets 30 inwardly, they do not increase the overall length of screen system 10 so that more of a window can be covered. Otherwise, gaps may otherwise exist between the vertical widow frame and end plates 22 that could permit light to enter a room. Preferably, brackets 30 are made of steel. According to other embodiments, the brackets are made of aluminum or other suitable material known to one of ordinary skill in the art.

Figure 5:
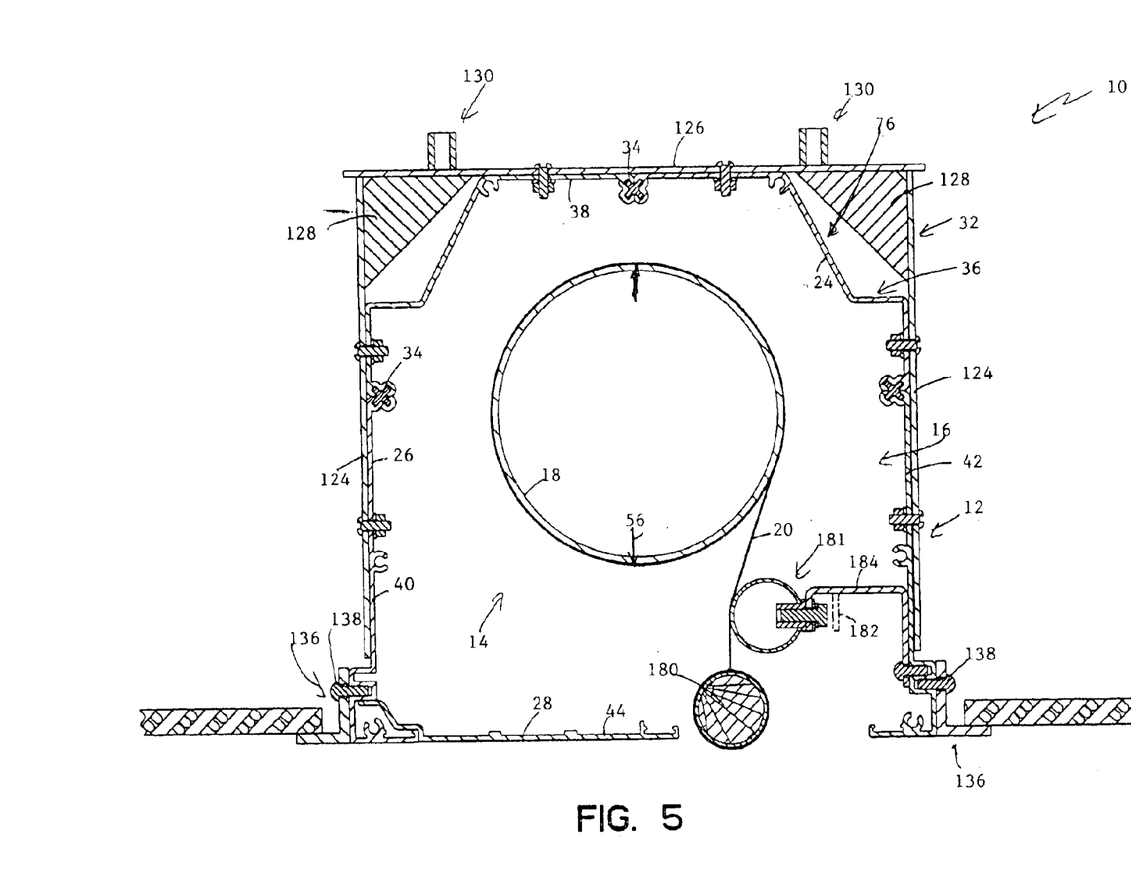
FIG. 5 is a cross-section view taken along line 5—5 of FIG. 1 showing the screen wrapped around the roller.

U-shaped brackets 32 help support housing body 36 between end plates 22 and also maintain the relatively square profile of housing body 36 to keep side walls 40, 42 from spreading or collapsing. As shown in FIGS. 2 and 5, brackets 32 include two side arms 124, a cross member 126 extending between side arms 124, a pair of gussets 128 to strengthen the connection between side arms 124 and cross member 126, and a pair of mounting bosses 130 to receive threaded rods (not shown) coupled to the ceiling to support housing body 36 between end plates 22. Upper corners 76 of housing body 36 are tapered to accommodate gussets 128 as shown in FIG. 5.

Brackets 32 are preferably are made of steel. According to alternative embodiments of the present disclosure, the brackets are made of other materials known to those of ordinary skill in the art such as aluminum.

Eye bolts 132 are provided in each L-shaped bracket 30 as shown in FIG. 2. During installation, an installer inserts a rope (not shown) through eye bolts 124 and hoists screen system 10 to the proper position. While supported by the rope, L-shaped brackets 30 are coupled to the ceiling or other support structure such as a window frame. Similarly, while supported by the rope, the threaded rods or other support members are coupled to U-shaped brackets 32 to couple U-shaped brackets 32 to the ceiling or other support structure. After being supported, the rope may be removed. Eye bolts 132 may also be removed, but are preferably left on L-shaped brackets 30 to facilitate lowering of screen system 10.

As shown in FIG. 5, housing body 36 may optionally be provided with a pair of longitudinally extending flanges 136 coupled to lower housing segments 36 by fasteners 138. Flanges 136 support ceiling tile or other ceiling finish material to cover any gap between housing body 36 and the ceiling finish material.

When supported in the ceiling, window frame, or other structural support of a building, housing 12 supports screen assembly 14 for raising and lowering of screen 20 between the raised position, shown in FIG. 5, and a lowered position. According to the preferred embodiment of the present disclosure, roller 18 is powered by a tubular motor 140, shown in FIG. 3, that unwinds and winds screen 20 on roller 18 during lowering and raising of screen 20. According to alternative embodiments of the present disclosure, the roller is manually operated.

Figure 3:
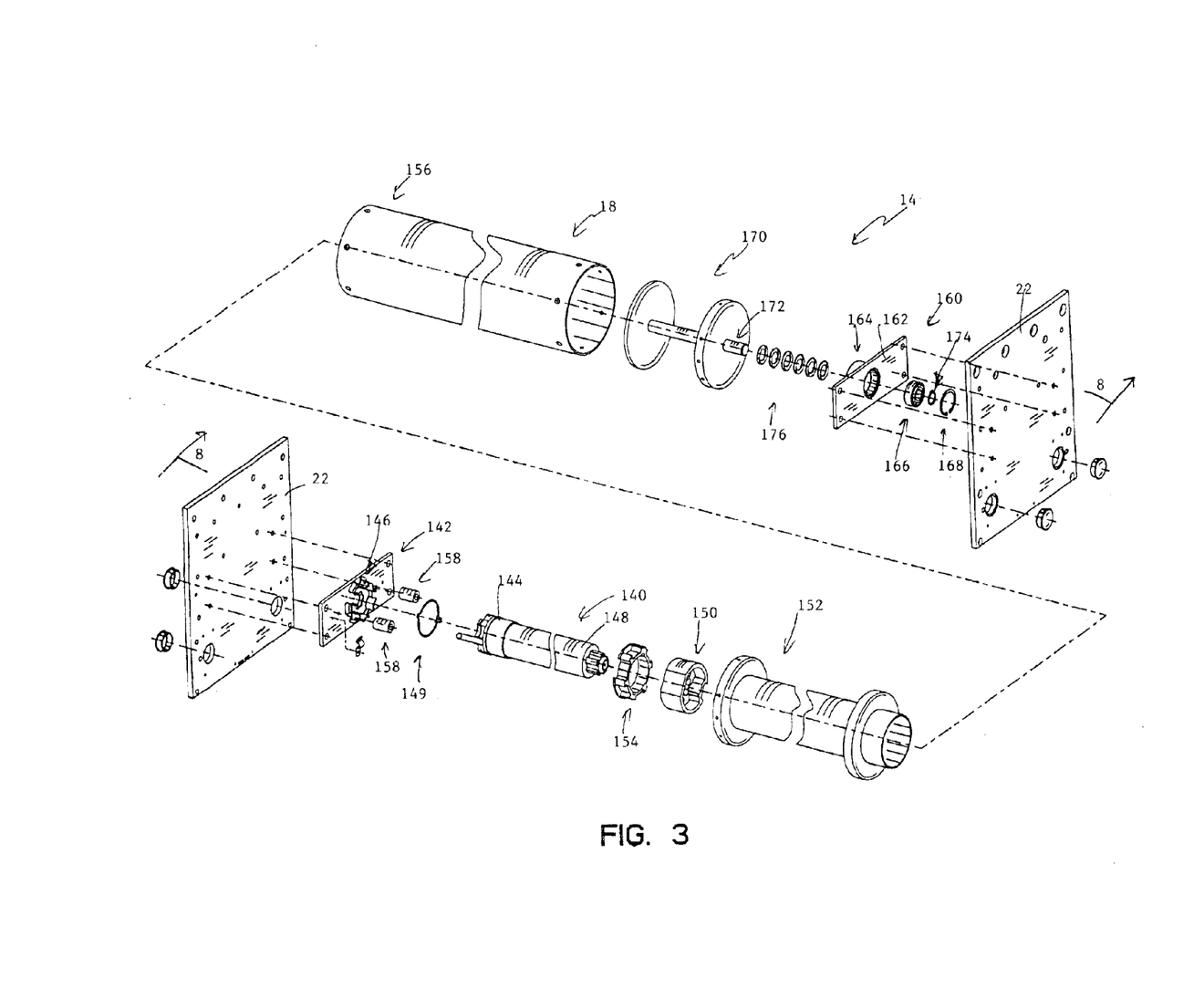
FIG. 3 is a perspective exploded view of the screen assembly of FIG. 1 and the end caps of the screen housing showing the screen assembly including a roller and a tubular motor normally positioned in the roller.

Screen assembly 14 includes a first motor support bracket 142 coupled to one of end caps 22. A stationary end or stator 144 of motor 140 slide inside tabs 146 mounted on support bracket 142. A spring ring 149 fits into radial grooves in tabs 146 and stator 144 to block stationary end 144 from being withdrawn from tabs 146. Motor 140 includes an exterior rotor 148 that extends into roller 18. Rotor 148 is keyed into a first adaptor 150 to transmit the rotation provided by motor 140. A first tubular support member 152 is coupled to and positioned between first adaptor 150 and roller 18 to further transmit the rotation to roller 18. A second adaptor or bearing 154 is positioned between tubular support member 152 and stator 144 to support a first end 156 of roller 18 and to facilitate rotation of roller 18 relative to stator 144. A pair of nylon bumpers 158 are mounted on support bracket 142 to blunt any movement of support member 152 toward support bracket 142.

Screen assembly 14 further includes a second motor support bracket 160 coupled to the opposite end cap 22. Support bracket 160 includes a plate 162 coupled to end cap 22 and a bearing support member 164 coupled to plate 162. A ball bearing 166 is positioned in bearing support member 164 and held in place with a snap ring 168. A second support member 170 is provided that is positioned in and coupled to roller 18. Second support member 170 includes a shaft 172 rotationally supported by ball bearing 166. A snap ring 174 is provided to prevent shaft 172 from being withdrawn from ball bearing 166. A plurality of washers 176 are also provided on shaft 172 between bearing 166 and the remainder of support member 170.

Figure 8:
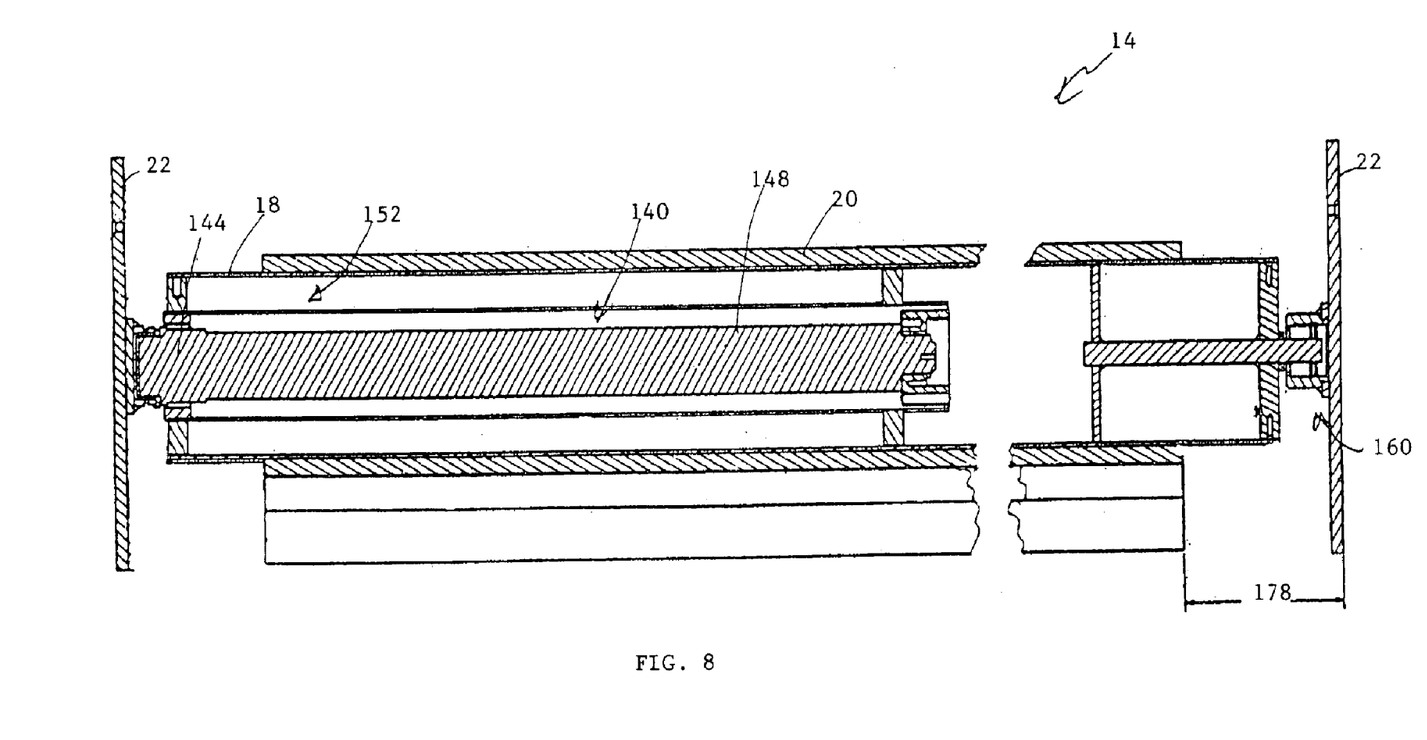
FIG. 8 is a cross-sectional view taken along ling 8—8 of FIG. 1 showing the screen system configured for use in a projection screen application.
Figure 9:
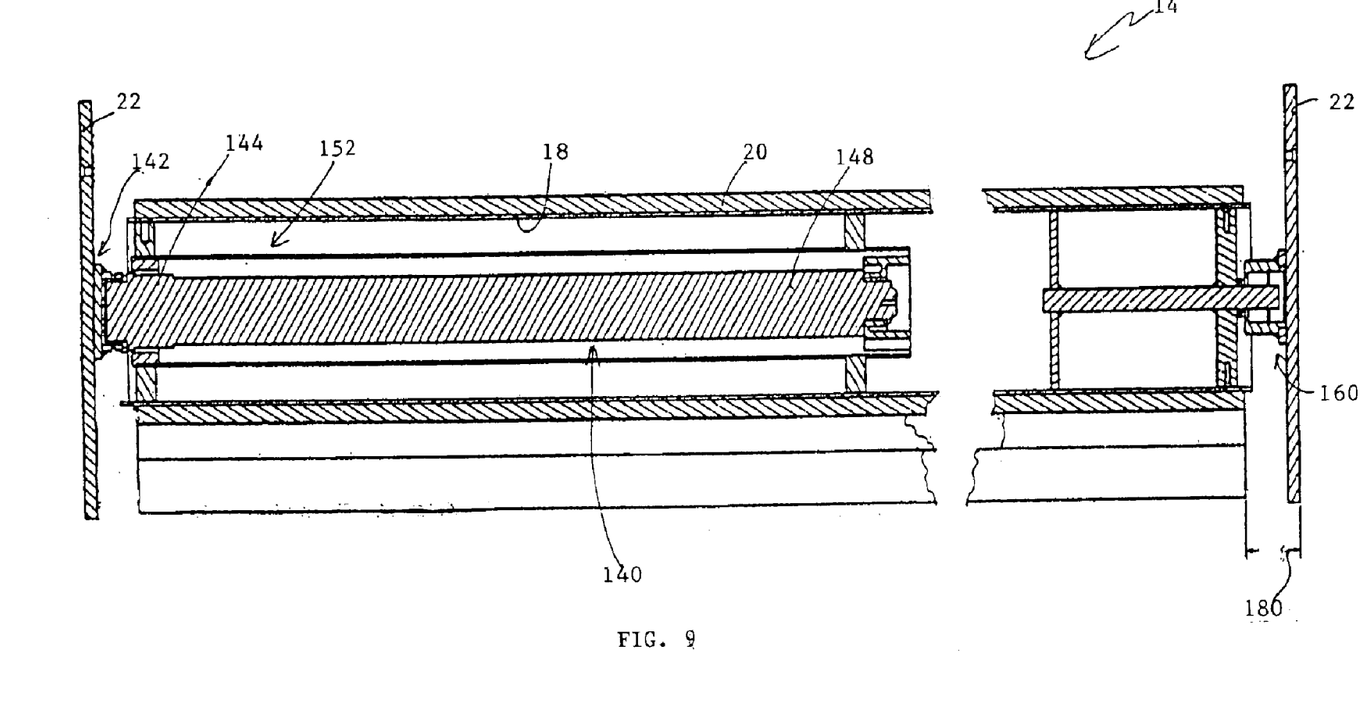
FIG. 9 is a view similar to FIG. 8 showing the screen system configured for use in a window shade application.

When screen system 10 is used in a projection screen application, first and second support members 152, 170 are mounted flush with the respective ends of roller 18 as shown in FIG. 8. Screen 20 is spaced a distance 178 of 5 inches from the outer ends of end caps 22. When screen system 10 is used in a window shade application, it is more important to limit any gaps between screen 20 and the window frame. To reduce or eliminate these gaps, first and second support members 152, 170 are positioned further inside roller 18 as shown in FIG. 9. Furthermore, screen 20 covers more of roller 18 so that is spaced a distance 180 of 1.75 inches from the outer end of caps 22. It is preferably to leave some gap between end caps 22 and screen 20 to provide clearance in case screen 20 creeps longitudinally on roller 18 during raising of screen 20. According to one alternative embodiment, the first and second support member 152, 170 are positioned further into roller 18 and screen 20 is positioned closure to end caps 22 so that little or no gap is present therebetween.

According to alternative embodiments of the present disclosure, other configurations of roller-operated screen assemblies and other types of screen assemblies are provided such as those disclosed in U.S. Pat. No. 6,443,207 to Cheng, U.S. Pat. No. 6,497,264 to Paskevicius, U.S. Pat. No. 6,152,205 to Toti, U.S. Pat. No. 5,746,266 to Colson, U.S. Pat. No. 5,680,891 to Prince, and U.S. Pat. No. 6,138,740 to Chou or other similar or known screen configurations known to those of ordinary skill of the art of window screens or projection screens. The disclosure of theses patents is hereby expressly incorporated by reference.

As previously mentioned, screen 20 may be configured to reflect images projected from a projector. In a projection screen application, screen 20 preferably has a reflectivity gain of about 0.4 to about 2.5. Screen 20 is substantially blank and free from text, graphics, or other printing or marking that would distort or detract from the images reflected by screen 20. Screen 20 may be made of a number of materials suitable for projection screen applications. Front projections screens are preferably white or light gray in appearance. Rear projection screens are preferably light gray in color and translucent to permit the projected image to transmit through the screen and be displayed to the audience. Some of the screens are acoustically transparent, like speaker cover fabric, to permit sound to be transmitted through the screen.

According to one embodiment, the screen includes a woven fiberglass backing with a vinyl reflective surface laminated to the fiberglass (gain of approximately 1.0). According to one embodiment, microscopic glass beads are provided on the viewing surface (gain from about 0.5 to about 2.5 depending on the viewing angle). According to another embodiment, the screen is made of a white (gain of about 1.0 or from about 0.4 to about 2.2 depending on the viewing angle) or light gray (gain of about 0.6 to 0.9 depending on the viewing angle) vinyl material without a backing. Other suitable projection screens known to those of ordinary skill in the art may also be provided. Preferably the screen is substantially blank so that it is substantially free of printing or other markings that noticeably detract from the images projected on the screen. According to one embodiment, the substantially blank screen is provided with black borders that frame the screen for "wide screen" or other projection formats.

As previously mentioned, screen 20 may be also configured to act as a window shade to block or filter light entering a room. In a projection screen application, screen 20 may have either 100% or less opacity. Screen 20 may be colored to match a particular décor. The outside surface may match in the interior surface or may be white. Screen 20 may be made of a number of materials suitable for shade applications. When total light blockage is desired, a close woven fiberglass material having each surface coated with vinyl may be provided. According to one embodiment, screen 20 is insulated to reduce heat loss. When only light filtering is desired, a fabric material is provided having an openness from 3 to 10%. Such material may be woven from polyester yarn or other material. According to alternative embodiments of the present disclosure, screen 20 is made of other materials suitable for projection or shade applications.

Screen 20 defines a pocket or channel 178 sized to receive a tensioning rod 180. Rod 180 keeps the lower end of screen 20 straight and provides additional weight at the lower end of screen 20 to keep screen 20 substantially flat.

Figure 4:
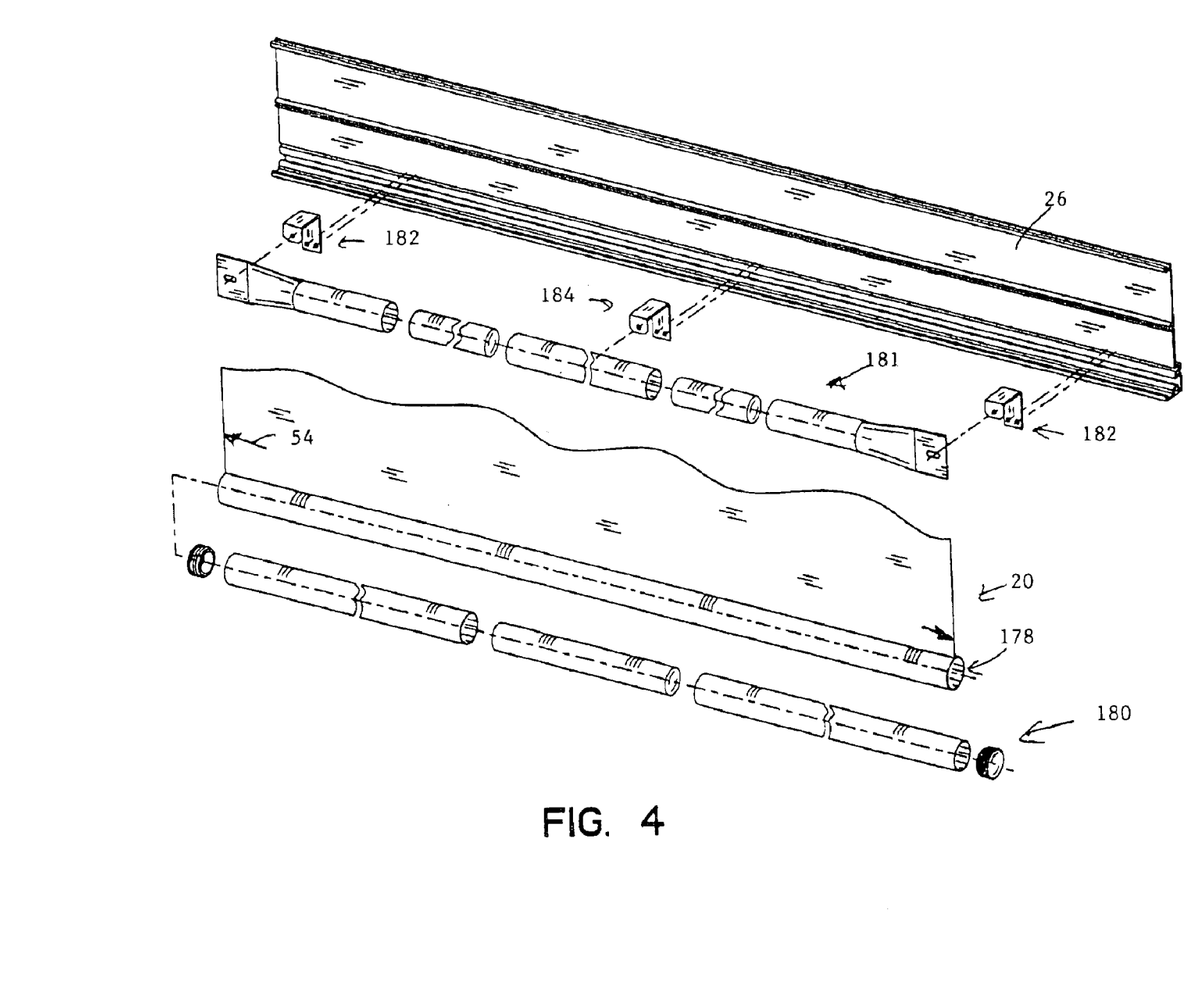
FIG. 4 is a perspective view of one of the extruded housing segments, a lower portion of a screen of the screen assembly; and a screen support tube or spreader bar positioned between the screen and the extruded housing segment.

Screen system 10 further includes a screen support tube or spreader bar 181 and three brackets 182, 184 as shown in FIGS. 4 and 5. Brackets 182, 184 support bar 180 on the back of housing body 36. Bracket 184 is slightly longer than bracket 182 so that support bar 180 has a slight deflection relative to the back of housing body 36. As shown in FIG. 5, screen 20 rides over bar 181. Depending on the length of roller 18, it may deflect downwardly because of gravity. The deflection in bar 181 helps prevent distortions in screen 20 due to the deflection of roller 18.

Preferably, instructions for the assembly, installation, and/or use of screen system 10 are provided with screen system 10 or otherwise communicated to permit a person or machine to assemble, install and/or use screen system 10. Such instructions may include a description of any or all portions of screen system 10 and/or any or all of the above-described assembly, installation, and use of screen system 10 or components of screen system 10. The instructions may be provided on separate papers and/or on the packaging in which screen system 10 is sold or shipped. These instructions may also be provided over the Internet or other communication system. Furthermore, the instructions may be embodied as text, pictures, audio, video, or any other medium or method of communicating instructions known to those of ordinary skill in the art.

Unless otherwise stated herein, the figures are proportional. Although the present invention has been described in detail with reference to preferred embodiments, variations and modifications exist within the scope and spirit of the present invention as described and defined in the following claims.

What is claimed is:

1. A screen system comprising
a screen assembly including a roller and a screen, and
a screen housing having a longitudinal axis and defining an interior region, the screen being positioned in the interior region of the screen housing, the screen housing including a plurality of extruded segments positioned in parallel relationship and at least one coupler positioned to couple at least two of the extruded segments together, the coupler extending parallel to the at two extruded segments.

2. The screen system of claim 1, wherein the coupler includes a plurality of coupler segments positioned end-to-end.

3. The screen system of claim 1, wherein the coupler has a length substantially equal to a length of the screen housing.

4. The screen system of claim 1, the two extruded segments coupled together by the coupler cooperate to define a channel configured to slidably receive the coupler.

5. A screen system comprising
a screen assembly including a roller and a screen, and
a screen housing having a longitudinal axis and defining an interior region, the roller and screen being positioned in the interior region of the screen housing, the screen housing including first and second housing segments positioned in parallel relationship and at least one coupler positioned to couple the first and second housing segments together, the coupler including a first channel and a second channel, a portion of the first housing segment begin positioned in the first channel, and a portion of the second housing being positioned in the second channel.

6. The screen system of claim 5, wherein coupler includes a plurality of lugs.

7. The screen system of claim 6, wherein the lugs cooperate to define an X-shape.

8. The screen system of claim 5, wherein the first channel of the coupler is substantially filled by the portion of the first housing segment and the second channel of the coupler is substantially filled by the portion of the second housing segment.

9. The screen system of claim 5, wherein the coupler is symmetric.

10. A screen system comprising a screen assembly including a roller and a screen, and a screen housing having a longitudinal axis and defining an interior region, the roller and screen being positioned in the interior region of the screen housing, the screen housing including first and second extruded housing segments positioned in parallel relationship and a first coupler positioned to couple the first and second extruded housing segments together, the second extruded housing segment being a substantial mirror image of the first extruded housing segment.

11. The screen system of claim 10, wherein the screen housing further includes third and fourth extruded housing segments, a second coupler positioned to couple third extruded housing segment to the first extruded housing segment, and a third coupler positioned to couple the fourth extruded housing segment to the second extruded housing segment, the fourth extruded housing segment is a substantial mirror image of the third extruded housing segment.

12. The screen system of claim 10, wherein the screen housing defines a longitudinally extending plane that divides the housing into first and second halves, the first extruded housing segment is positioned on a first half and the second extruded housing segment is positioned on the second half.

13. The screen system of claim 10, wherein the housing is box-like having at least first and second corners, the first extruded housing segment defines the first corner, an the second extruded housing segment defines the second corner.

14. A screen system comprising a screen assembly including a roller and a screen, and a screen housing having a longitudinal axis and defining an interior region, the roller and screen being positioned in the interior region of the screen housing, the screen housing includes at least one extruded member having a longitudinal length and nominal wall thickness, the nominal wall thickness-to-longitudinal length ratio being less than $8 \times 10^{-4}$.

15. The screen system of claim 14, wherein the screen housing has a length greater than 14 feet.

16. The screen system of claim 15, wherein the nominal wall thickness of the extruded member is less than 0.11 inches.

17. The screen system of claim 14, wherein the nominal wall thickness-to-longitudinal length ration is less than $7 \times 10^{-4}$.

18. The screen system of claim 14, wherein the screen housing includes a plurality of extruded members that cooperate to define the interior region of the screen housing.

19. The screen system of claim 18, wherein each of the plurality of extruded members has a length and a maximum width, the maximum width of each of the plurality of extruded members is less than 7 inches.

20. The screen system of claim 14, wherein the housing includes a plurality of extruded housing member cooperating to defile top and side walls of the housing, each of the plurality of extruded housing members has a longitudinal length and nominal wall thickness, each of the nominal wall thickness-to-longitudinal length ratios being less than $8 \times 10^{-4}$.

21. A screen system comprising a screen assembly including a roller and a screen, a screen housing defining an interior region, the roller and screen being positioned in the interior region of the screen housing, the screen housing having first and second side walls, the first side wall including a wall formation thereon, and a closure having a closure formation, the closure formation being configured to couple the closure to the wall formation, the closure and the second side wall defining an opening therebetween sized to permit the screen to move therein during raising and lowering of the screen relative to the screen housing, the wall formation and the closure formation cooperate to permit movement of the closure along a path transverse to the first wall to couple the closure formation to the wall formation.

22. The screen system of claim 21, wherein the opening faces in a downward direction and at least one of the wall formation and the closure formation define a channel having an opening facing in a horizontal direction.

23. The screen system of claim 21, wherein the path is linear.

24. Th screen system of claim 21, wherein the closure and the first wall define angles therebetween of greater than 70 degrees during the duration of the travel of the closure along the path.

* * * * *